United States Patent

VanSickle

[15] 3,685,556
[45] Aug. 22, 1972

[54] CONTOUR CUTTING APPARATUS

[72] Inventor: Don C. VanSickle, 1435 Northview Place, Redlands, Calif. 92373

[22] Filed: Sept. 30, 1970

[21] Appl. No.: 76,783

[52] U.S. Cl............143/26 A, 144/145 R, 144/242 E
[51] Int. Cl........................B23d 53/08, B23d 55/04
[58] Field of Search................143/26 R, 26 A, 26 B; 144/145 AR, 242 R, 242 C, 242 D, 242 E

[56] References Cited

UNITED STATES PATENTS

| 1,229,987 | 6/1917 | Littleford............144/242 R X |
| 2,552,367 | 5/1951 | Carlson..............144/242 R X |
| 3,376,908 | 4/1968 | VanSickle..............144/242 R |

FOREIGN PATENTS OR APPLICATIONS

| 14,277 | 4/1965 | Japan.....................144/242 R |

Primary Examiner—Andrew R. Juhasz
Assistant Examiner—Michael Koczo, Jr.
Attorney—Fulwider, Patton, Rieber, Lee & Utecht

[57] ABSTRACT

A work feeding apparatus for power tools of the class having a cutting tool operating in a fixed zone of a stationary work table. A pair of opposed guide means fixed on opposite sides of the tool zone define a channel through which successive work pieces advance to be cut by the tool, the pair of guide means being of a predetermined profile to effect cutting of a desired straight and/or curved contour in each work piece. A pair of power-driven feed rolls are positioned at entrance and exit ends of the channel, each being independently biased into driving engagement with the work piece to accommodate varying angularities of the work piece relative to the tool. The pair of feed rolls are also counterbalanced to be equally offset from the blade during straight cuts in the work piece. The feed roll at the entry to the channel is yieldably linked to an opposing counterpressure roll to augment the force of the entry feed roll in feeding the work piece while decreasing frictional resistance of the guide means to passage of the work piece. The pair of drive rolls are drivingly coupled together by a means including a limited lost motion to accommodate a difference in angular speed of one of the rolls in transition from an idle to a driving phase.

11 Claims, 11 Drawing Figures

Patented Aug. 22, 1972
3,685,556
3 Sheets-Sheet 1
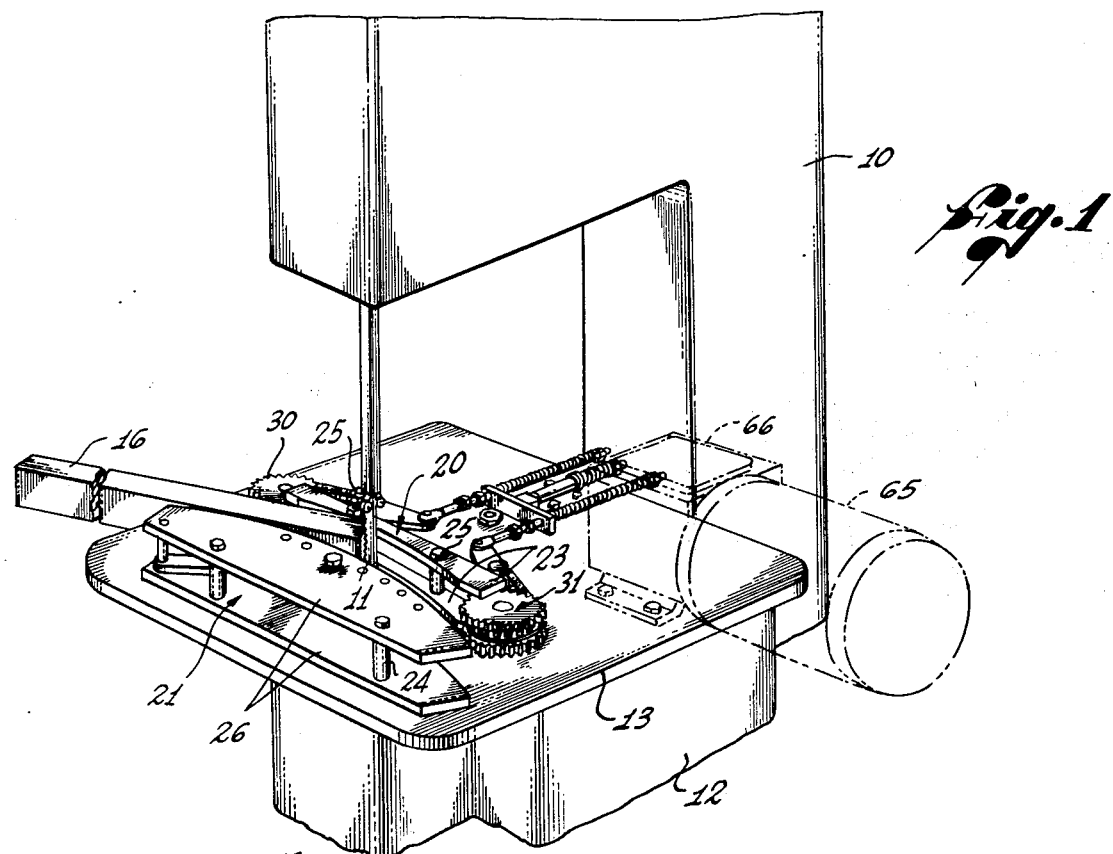
Fig. 1
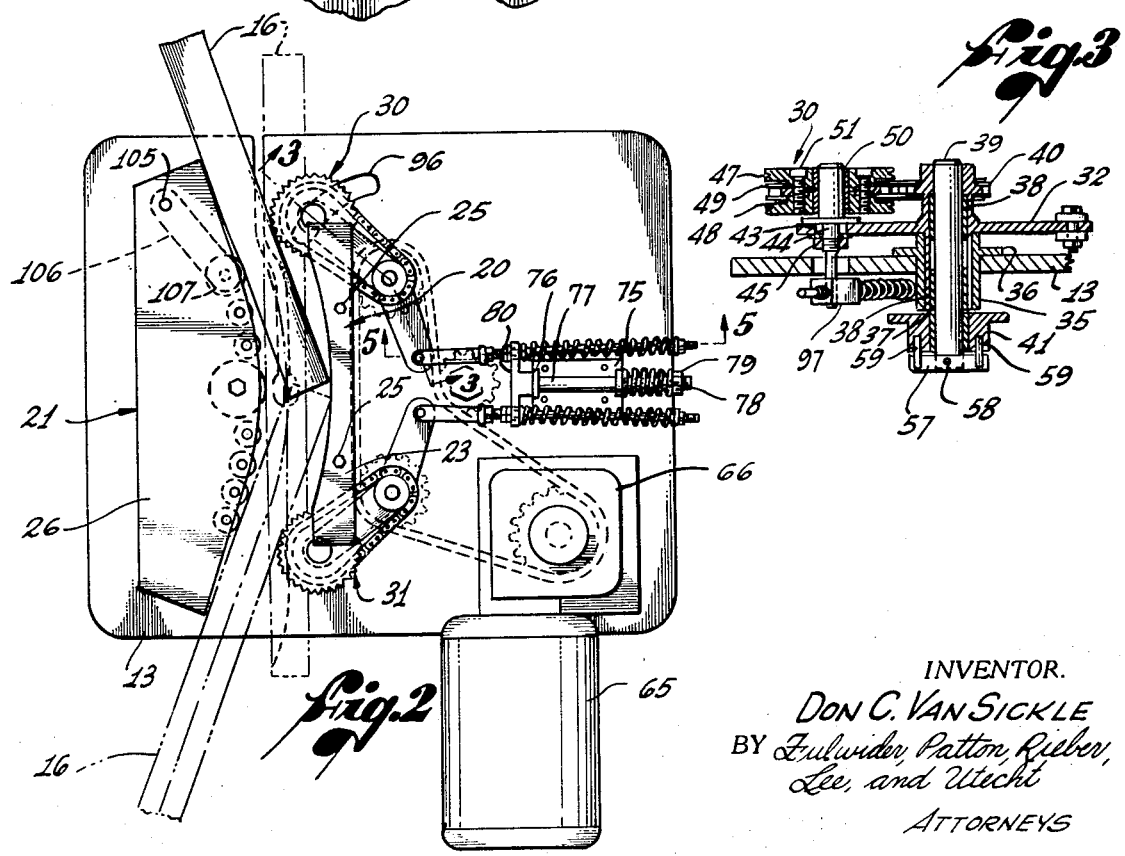
Fig. 2
Fig. 3
INVENTOR.
DON C. VAN SICKLE
BY Fulwider, Patton, Rieber,
Lee, and Utecht
ATTORNEYS Patented Aug. 22, 1972 3,685,556

INVENTOR.
DON C. VAN SICKLE
BY Fulwider, Patton, Rieber
Lee, and Utecht
ATTORNEYS

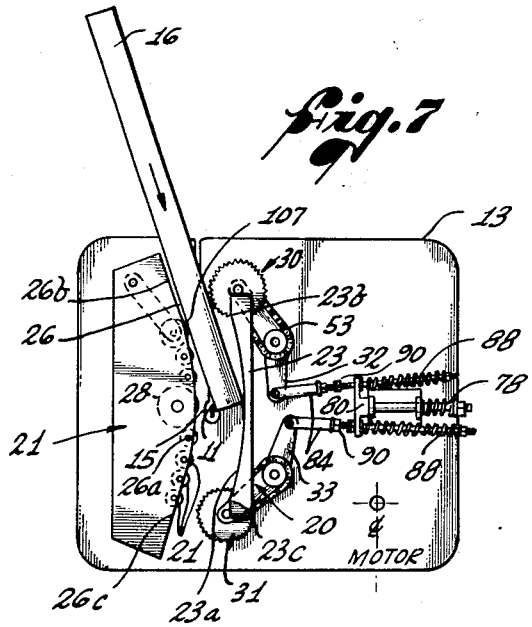
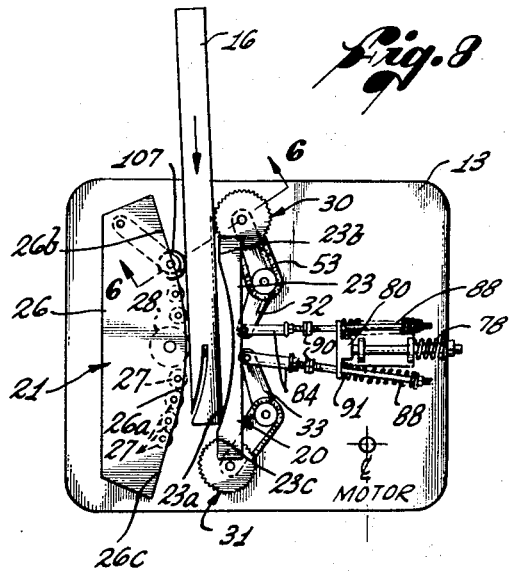
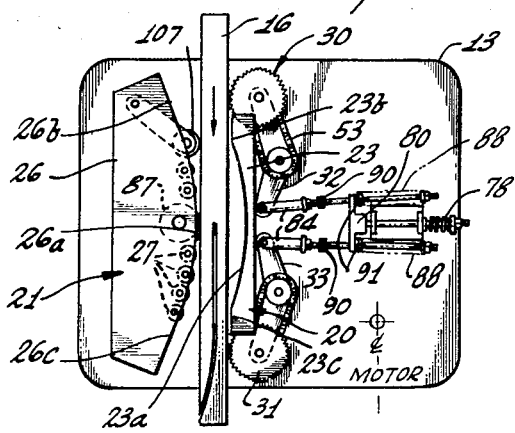
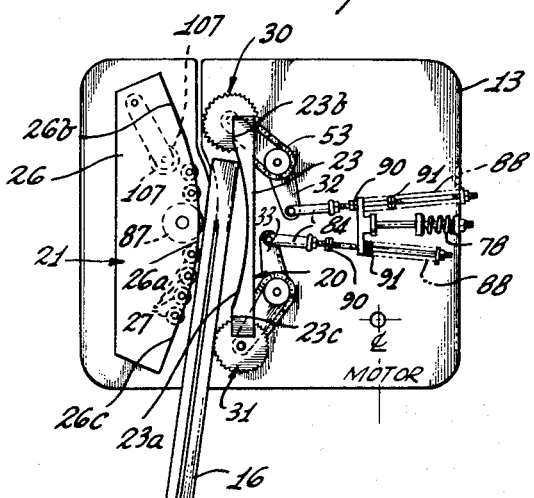
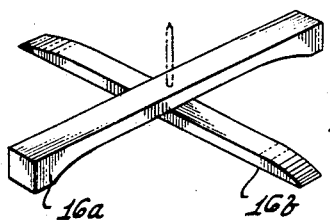

CONTOUR CUTTING APPARATUS

The present invention relates to apparatus for automatically cutting contours through elongate work pieces by feeding them to a tool operating in a fixed zone and constitutes an improvement over my prior U.S. Pat. No. 3,376,908. While the invention has special utility in connection with band saws, it is of general utility with respect to machine tools of this class.

FIG. 1 is a perspective view of a band saw incorporating a presently preferred embodiment of the invention.

FIG. 2 is a top plan view of the work feeding apparatus, also illustrating a work piece in various phases of transition therethrough, FIG. 3 is a sectional view, on an enlarged scale, taken on the line 3—3 of FIG. 2 and showing a portion of the drive mechanism for one of the feed rolls.

FIGS. 7 through 10 are somewhat schematic top plan views of the work feeding apparatus, illustrating the relationship of the parts in various phases of the transition of a work piece therethrough.

FIG. 11 is a perspective view of the contour-cut, severed portions of a work piece, shown assembled as a tree stand.

Figure 4:
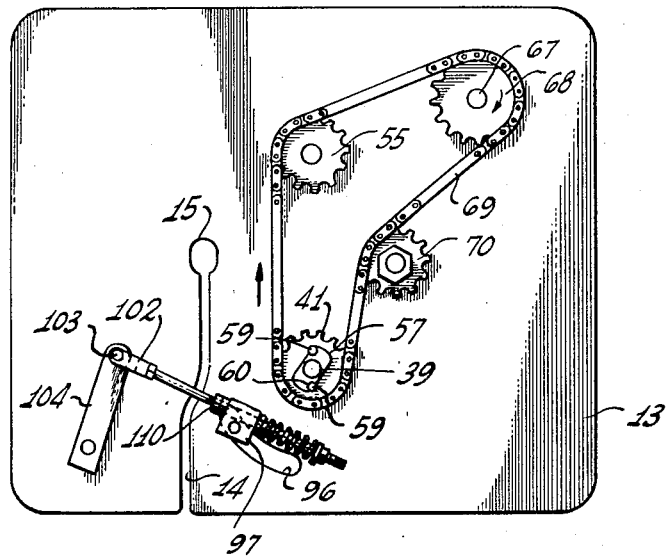
FIG. 4 is a bottom plan view of the work table.
Figure 5:
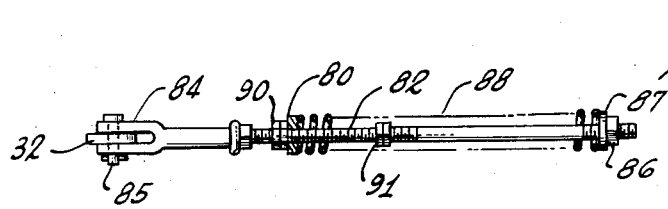
FIG. 5 is a sectional view, on an enlarged scale, taken on the line 5—5 of FIG. 2, illustrating details of construction of a means for independently biasing one of the feed rolls.

In the drawings, the invention is illustrated in a form especially adapted for woodworking and, further, especially adapted for longitudinally severing straight lengths of wood along a straight and curved contour line to make two portions that can be assembled into the well known form of a tree stand. However, it will be understood that the invention is not limited to this particular application but may be employed with other machine tools and on other materials for cutting other contours.

Referring to FIG. 1, a conventional band saw 10, with the usual endless blade 11, includes a base 12 on which a work table 13 is fixedly mounted. As will be apparent, the invention may be an integral part of the band saw but, customarily, takes the form of an attachment. In either event, the table 13 is provided with a slot 14 extending from one edge of the table to the mid-line thereof and terminating in an enlarged opening 15. With this arrangement, the slot 14 provides clearance for the saw blade 11 in removing and replacing a blade. The enlarged opening 15 defines the fixed zone through which the blade runs.

This form of the invention is adapted for cutting elongate blocks of wood 16 into two longitudinally severed portions 16a and 16b. As can be seen from FIG. 11, the two portions of the work piece 16 have been severed out of a rectangular block along a contour line that includes a pair of radius cuts at opposite ends of a relatively long straight cut, the line of severance commencing and terminating in the same plane of the original block of wood 16. The arrangement of the feed apparatus is such that successive work pieces 16 may be fed therethrough practically in end-to-end relationship, with a minimum of idle time of the blade 11, whereby an extremely high rate of production can be achieved.

The table 13 is provided on its upper face with a pair of guide assemblies 20 and 21. These assemblies are fixedly mounted on the plate 13, on opposite sides of the hole 15 through which the blade 11 runs, to define a generally arcuate channel extending transversely of the table 13. The arrangement is such that confronting portions of the guide assemblies 20 and 21, along with the surface of the work table 13 included therebetween and in association with the feed rolls, constrain each block of wood 16 for straight and curved linear movement therethrough along a line of intersection with the blade 11 resulting in the curved and straight line cuts illustrated in FIg. 11.

More specifically, the concave guide assembly 20 comprises an identical pair of elongate rigid bars 23 that are held in vertically spaced apart parallel superposed relationship, as by means of a spaced plurality of tubular sleeves 24. To hold the pair of bars 23 in assembled relationship and onto the table 13, suitable screw fasteners 25 are passed through aligned holes in the bars 23 and corresponding ones of the spacer sleeves 24 and threadedly engaged with bores in the table 13.

Similarly, the convex guide assembly 21 comprises an identical pair of elongate plates 26, also arranged in congruent vertically spaced apart, parallel relationship by a plurality of the spacer sleeves 24 and fixedly held in place on the work table 13 by means of fasteners 25.

The confronting portions of the guide assemblies 20 and 21 are made with a profile adapted to produce the particular form of contour cut which is desired, which may be simply a straight line cut, curved cuts of constant or varying radii, or combinations of straight and curved cuts. Thus, for purposes of the tree stand in FIG. 11, the confronting edges of the pairs of plates 23 and 26 are made with the profiles best seen in FIGS. 7 through 10.

Each bar 23, on its edge confronting the blade 11, has a concave curved profile 23a comprising an arc of a circle subtending the major portion of the length of the bar 23 and terminating at opposite ends in flat portions 20b and 20c oriented in parallel offset relationship to the plane of the blade 11. It will be observed that the cutting or working edge of the blade 11 is disposed substantially at the mid-line of the table 13 and the guide profile of the bars 23 is symmetrical about this mid-line.

The guide assembly 21 may be adapted for either sliding or rolling contact with the work piece 16. In either event, that portion of the guide assembly 21 confronting the guide assembly 20 or provided with an intermediate convex sector substantially defining a curve or arc that is geometrically similar to the curved sector 23a of the guide bars 23. Thus, in a sliding arrangement, each of the plates 26 along its edge confronting a bar 23, may be formed with a curved portion 26a of constant radius to define an arc concentric with the sector 23a of the opposing bar and of equal angularity. The opposite terminal edge portions 26b and 26c of each plate 26 are arranged tangentially to the intermediate curved portion 26a.

For rolling engagement of the work piece with the guide assembly 26, which is preferable, a plurality of rollers 27 may be arranged in vertically disposed positions, journaled at opposite ends in the opposed plates 26, with their peripheries equally protruding slightly beyond corresponding edges of the plates 26. At the mid-line of the work table 13 a roller 28 of larger bearing diameter than the rollers 27 may be employed, with its axis journaled between the plates 26 and on the mid-line of the work table 13. The larger diameter of bearing is desirable at this location to reduce friction during the relatively long straight cut in the work.

Work pieces 16 are forced through the apparatus by an entry feed roll 30 and an exit feed roll 31. As the work pieces 16 may vary considerably from a nominal thickness, both of the feed rolls 30 and 31 are provided with a biasing means whereby they normally protrude into the channel defined between the guide assemblies 20 and 21. As a work piece 16 progresses through the apparatus, it is engaged first by the entry feed roll 30, then simultaneously by the pair of feed rolls 30 and 31, and, finally, solely by the exit feed roll 31. Accordingly, each of the rolls 30 and 31 is independently self adjustable to the thickness of the particular work piece passing through the apparatus during phases when the work piece is being driven by one only of the rolls. During an intermediate phase of the operation, when the work piece is being driven by both rolls 30 and 31, the pair of rolls are self counterbalancing and adjust in unison to the particular thickness of the work piece.

More particularly, each of the feed rolls 30 and 31 is mounted on one of a pair of symmetrically arranged bell cranks 32 and 33, each of which is pivotally mounted on the top of the table 13. Since the manner of mounting the bell cranks is the same, only one mounting arrangement will be described.

Referring to FIG. 3, the table 13 is formed with a hole which mounts a sleeve bearing 35 that is externally formed with a flange 36 adapted to seat on the upper surface of the table and, further, adapted to receive a fastening means for securing the bearing to the table. The bell crank 32, at the intersection of its two arms, is integrally formed with a sleeve 37 that is pivotally mounted in the bushing 35. The sleeve 37, in turn, mounts a spaced pair of bushings 38 to provide journal bearing support for an elongate shaft 39 that protrudes beyond both the upper and lower ends of the sleeve 37, in order to mount sprocket wheels 40 and 41, respectively.

To mount a feed roll, the bell crank 32, at the swingable end of its outer arm, is formed with a slot 43 to receive a reduced diameter threaded shank of a stud bolt 44 that is secured in place by means of a nut 45. The roll 30 comprises a pair of wheels 47 and 48 flanking opposite sides of a sprocket wheel 49, the wheels preferably, but not necessarily, having peripheral teeth. The wheels 47 and 48 are co-axially mounted on a bushing 50 rotatably supported on the stud of the bolt 44, with the pair of toothed wheels and the sprocket wheel 49 being fixedly secured together, as by means of a fastener 51. It will be noted that the sprocket wheel 49 is substantially smaller in diameter than the toothed wheels 47 and 48 and is drivingly engaged by an endless chain 53 that is also drivingly connected to the adjacent sprocket wheel 40. The chain is thus recessed sufficiently to avoid contact with the work piece 16 when the piece is engaged by the teeth of the wheels 47 and 48. The small sprocket 40 is keyed to the shaft 39 which, in turn, is drivingly interconnected to a chain at its lower end.

The mounting of the other feed roll 31 to its bell crank 33 is in all respects identical to that just described in connection with the feed roll 30, except that the shaft 39 for the exit end roll 31 is directly keyed to a sprocket wheel 55 at its lower end, as can be seen in FIG. 4. By contrast, the sprocket wheel 41 for the entry feed roll is drivingly interconnected to its shaft with a limited degree of lost motion.

Referring again to FIG. 3, it will be seen that the shaft 39, at its lower end, has a diametrically extending cross bar 57 secured thereto, as by means of a crossing pin 58. The lower end face of the sprocket wheel 41 fixedly mounts a diametrically opposite pair of drive lugs 59 that project axially to engage opposite sides of the cross bar 57. The relationship of the drive lugs 59 to the cross bar 57 can best be seen in FIG. 4. As will now be apparent, the arrangement is such that a limited degree of relative angular movement is permitted between the shaft 39 and its cross bar 57, on the one hand, and the sprocket wheel 41, on the other hand. Thus, assuming clockwise rotation of the sprocket wheels 41 and 55, as viewed in FIg. 4, the drive lugs 59 of the sprocket wheel 41 are engaged in pockets 60 formed in opposite edges of the cross bar 57. However, due to the fact that the pair of bell cranks 32 and 33 and their corresponding drive rolls 30 and 31 undergo independent pivotal movement during certain phases of the operation, the linear speeds of their toothed wheels and the rate of rotation of their drive shafts 39, are not always the same. Accordingly, upon any differential occurring, one of the sprocket wheels 41 and 55, in effect, overrunning the other, the limited degree of relative angular movement permitted between the drive lugs 59 and the cross bar 57 compensates for the difference without unduly stressing the interconnected parts of the drive mechanism.

As will be apparent, the drive rolls 30 and 31 may be driven from any convenient power source. For example, a variable speed electrical motor 65 may be coupled to a reduction gear box 66 mounted on top of the table 13, the gear box, in turn, having an output shaft 67 protruding from the bottom of the table, as shown in FIG. 4. A drive sprocket wheel 68 is keyed to the output shaft 67 and drivingly interconnected to an endless chain 69 that is trained around the sprocket wheels 41 and 55, as well as around an idler sprocket wheel 70.

The biasing means for the drive rolls 30 and 31 is mounted on top of the plate 13 by means of a bracket 75. A pair of upstanding lugs 76 are integrally formed at opposite ends of the bracket, the lugs being formed with holes therethrough having a common axis disposed on the mid-line of the table 13. A shaft 77 is axially slidably mounted in the holes of the pair of lugs 76, having a portion projecting rearwardly of the rear lug 76 for mounting a helical spring 78 in compression between the rear face of the rear lug 76 and a nut and washer abutment 79 mounted on the rear end of the shaft 77. With this arrangement, a T-shaped yoke 80, secured to the forward end of the shaft 77, is normally biased against the front face of the forward lug 76.

Each of the oppositely extending arms of the T-shaped yoke 80 is formed with a horizontally elongated slot therethrough to horizontally rockably mount an elongate threaded rod 82. The forward end of each rod 82 mounts a clevis 84 that receives the swingable end of the inner arm portion of one of the bell cranks 32 and 33, the clevis and its corresponding bell crank being pivotally interconnected by a fastener means 85. The rear end of the rod 82 threadedly mounts a nut 86 to a seat for a washer 87 providing an opposing abutment for the rear face of the corresponding arm of the yoke 80. A helical spring 88 is mounted between the opposed abutments so defined, under compression, to pivot the corresponding bell crank 32 or 33 for normally biasing its associated feed roll into the path of work pieces moving through the apparatus. As will be apparent, the nuts 86 can be adjusted to equalize the compression of the pair of springs 88.

Each rod 82 is reciprocable relative to the yoke 80 within a predetermined range as determined by spaced pairs of stop nuts 90 and 91 threadly engaged with the rod on opposite sides of an arm of the yoke 80. As will be apparent from an examination of FIGS. 7 through 10, the position of the pair of nuts 90 axially of a rod 82 determines the extent to which the corresponding feed roll can protrude into the channel between the guide assemblies 20 and 21. The pair of nuts 91 of both rods 82 are so adjusted as to come into abutment with the rear face of the arms of the yoke 80, in order to unseat the yoke from the front face of the front bracket lug 76 during that phase of the sequence of operations when both feed rolls are drivingly engaged with the work piece 16.

From an examination of FIGS. 7 through 10, it will be observed that there is an initial phase in which the work piece is fed to the blade 11 solely by the entry feed roll 30, the exit feed roll 31 being idle in the sense that it is not in driving engagement with the work. During this phase, the work piece is undergoing a radius cut and, in transition from the first radius cut to the straight cut, must displace the exit feed roll 31. Throughout this phase, one edge of the leading end of the work piece 16 is in sliding frictional engagement with the exit half of the curved sector 23a of the guide assembly 23 with a force proportional to the pressure of the entry feed roll 30 against the confronting side of the work piece 16. In order to reduce this friction in this phase of the operation, without loss of feeding force, I have devised a counterpressure roll arrangement operatively associated with the entry feed roll 30.

Figure 6:
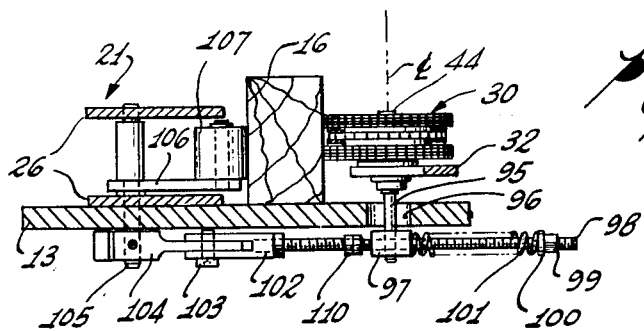
FIG. 6 is a sectional view, on an enlarged scale, taken on the line 6—6 of FIG. 8 and illustrating details of construction of an entry feed roll and opposed counterpressure roll.

Referring to FIG. 6, it will be seen that the stud bolt 44 that mounts the feed roll 30 is integrally formed with a downwardly projecting extension 95 that is freely swingable in an arcuate slot 96 formed through the table 13. Beneath the table, the extension 95 has an abutment member 97 pivotally secured thereto for co-movement with the extension 95. The member 97 is formed with a horizontal bore through which a threaded rod 98 is freely mounted, the rod being oriented transversely of the passage between the pair of guide assemblies 20 and 21. That end of the rod 98 underlying the feed roll 30 mounts a nut 99 and washer 100 providing a fixed abutment for one end of a helical spring 101 around the rod 98, the other end of the spring abutting against one side of the member 97.

The other end of the rod 98, underlying the guide assembly 21, is interconnected to or fixedly interconnected to a yoke 102 that is pivotally interconnected, as at 103, to the swingable end of a lever 104, the latter being clamped to the lower end of a vertical shaft 105 that is journaled in the pair of plates 26 of the guide assembly 21.

Between the guide plates 26, the shaft 105 carries a crank arm 106 whose orientation can best be seen in FIG. 2, the arrangement being such that the crank arm 106 substantially overlies the lever 104 beneath the plate 13. Mounted on the swingable end of the crank arm 106 is a roller 107 in opposed relationship to the entry feed roll 30.

With the arrangement just described, the pressure roller 107 is yieldably linked to the entry feed roll 30 in order to change position laterally with respect to the channel between the guide assemblies 21 and 20, along with change of position of the feed roll 30, while at the same time being firmly spring biased into pressure engagement with the opposite side of the work piece 16 from the feed roll 30.

The rod 98, in the length between the member 97 and the pivotal connection 103, carries a lock nut means 110 against which the member 97 is normally biased by the spring 101, when no work piece is disposed between the pressure roller 107 and the feed roll 30. This condition is illustrated in FIG. 4 and the lock nuts are initially adjusted axially of the rod 98 to a position wherein a minimum gap is defined between the roller 107 and the drive roll 30, which is less than the least thickness of the work piece 16 which is to be encountered. Upon a work piece 16 being fed between roller 107 and the drive roll 30, as in FIG. 7, the spring 101 is immediately compressed as a result of the initial displacement of the roller 107. Subsequently, as the feed roll 30 is displaced laterally by the work piece 16, as in FIG. 8, the pressure roller 107 also swings outwardly and is constantly forceably biased into contact with the opposite side of the work piece by the continuing compressed state of the spring 101. As a result, the friction of that edge of the leading end of the piece 16 against the exit halves of the curved sectors 23a is reduced without loss of work feeding force.

The apparatus can handle any length of work in excess of a minimum length capable of being simultaneously engaged by the feed rolls 30 and 31 at their maximum lateral separation. From an examination of FIG. 9, it will be seen that the maximum width of work piece which can be accommodated is equal to the normal distance between a plane including the opposite end portions 23b and 23c of the guide assembly 20 and a parallel plane tangent to the confronting portion of the guide means 21, in this case tangent to the periphery of the roller 28 protruding beyond the plates 26.

Initially, the apparatus is set up or adjusted to handle the nominal thickness of the work pieces 16. First, the pair of side springs 88 are removed to allow free pivotal movement of the bell cranks 32 and 33 and the feed rolls 30 and 31 supported thereon. A specimen of the work piece 16 is then centered in the apparatus as shown in FIG. 9. Thereafter, the pairs of stop nuts 91 are adjusted for engagement with the yoke 80 simultaneously with simultaneous engagement of the feed rolls 30 and 31 within the work piece 16, while the work piece is in parallel offset relationship to the flat edges 23b and 23c of the concave guide means. This adjustment is carried out with the yoke 80 offset forwardly from the front lugs 76 a distance equal to the gap between the work piece 16 and the flat faces 23b and 23c, with the spring 78 under compression. Thereafter, the side springs 88 are replaced and put under equal compression to give the desired degree of pressure on the feed rolls 30 and 31.

With the sample work piece 16 removed, the pairs of stop nuts 90 are now adjusted for adjusting the positions of the feed rolls 30 and 31 relative to the convex guide means 21 to define equal gaps less than the least thickness of work piece 16 to be encountered. Finally, the spring pressure for the counterpressure roller 107 is adjusted in the manner previously described. As will be apparent, the finally adjusted positions of the parts may vary considerably, depending on the thickness of the work pieces being handled. Thus, the parts as represented in FIG. 2 represent a different state of adjustment than is represented in FIGS. 7 through 10.

As the leading end of a work piece 16 is introduced into the apparatus, it is subjected to the opposed pressures of the feed roll 30 and the counterpressure roll 107 and forced to the position of the work piece shown in FIG. 7, wherein one edge of the leading end of the work piece first engages the concave guide assembly 20 at about the axis of symmetry. The entry feed roll 30 has now been displaced inducing compression in its associated spring 88, as well as compression of the counterpressure roller spring 101, for firmly forcing the work piece through the first radius cut.

As the first radius cut progresses, as in FIg. 8, the entry feed roll 30 and the counterpressure roller 107 linkedly connected thereto, are progressively displaced towards the guide assembly 20, effecting a further compression of the spring 88 associated with the entry feed roll. During this phase, depending upon the relative compression of the counterbalanced pair of springs 88 and the center spring 78, the yoke 80 may be displaced from the front lug 76, although, under some conditions, such unseating of the yoke 80 will not occur until the work piece 16 comes into the straight cut position of FIG. 9. In the case of a relative compression of the springs as illustrated in FIG. 8, it will be observed that the balance of forces is such that the exit feed roll 33 is being displaced prior to the leading edge of the work piece 16 coming into contact therewith, in order to reduce resistance to passage of the work piece in the transition from the first radius cut to the straight cut.

Referring to FIG. 9, it will be seen that work pieces 16 normally are guided during the straight cut by the center roller 28 acting in symmetric opposition to the spring counterbalanced pair of feed rolls 30 and 31. Subsequently, during the second radius cut, the work piece is guided by the exit half of the convex guide portion at 26c acting in opposition to the entry half of the contour 23c engaged by one end of the trailing edge of the work piece and the exit feed roll 31. As will be apparent from FIG. 10, the work pieces 16 may be fed in practically end-to-end relationship since the entry feed roll 30 is now repositioned in readiness to accept a new work piece prior to the completion of the second radius cut in the prior work piece.

While a presently preferred embodiment of my invention has been shown and described, it will be apparent to those skilled in the art that modifications may be made therein without departing from the invention.

I claim:

1. Work feeding apparatus for contour cutting of elongated work pieces, comprising:
   a work table having a fixed tool zone;
   a spaced pair of rigid guide means affixed to said table to define a laterally extending work piece passage therebetween and through said tool zone;
   a pair of feed rolls mounted on said table at spaced locations on opposite sides of said tool zone and along one of said guide means;
   each of said feed rolls being mounted for movement towards and away from the other of said guide means;
   said pair of feed rolls being independently biased toward the other of said guide means to bias a work piece into guided contact with said other guide means independently of the other of said feed rolls;
   said pair of feed rolls each normally projecting into said passage defined by said pair of guide means to be sequentially laterally displaced by a work piece fed thereinto; and
   a means for driving said feed rolls to feed a work piece through said tool zone.

2. An apparatus as in claim 1 in which:
   said pair of guide means define a curved sector in said passage comprising a convex portion of said other guide means and a concave portion of said one guide means;
   said portions being adapted to translate linear movement of a work piece through said passage into turning of the work piece for arcuate cutting of the work piece;
   said pair of feed rolls being adapted and arranged for simultaneously biasing a work piece against said convex portion during one phase of the work piece movement through said passage.

3. An apparatus as in claim 2 in which said pair of feed rolls are interconnected by a common biasing means to simultaneously bias both of said rolls into engagement with a work piece.

4. An apparatus as in claim 3 in which each of said rolls is interconnected to a spring means for independently biasing said roll into contact with a work piece, each of said spring means including a means to adjust the force thereof whereby the pair of said spring means can be counterbalanced.

5. Am apparatus as in claim 1 in which:
   a counterpressure roller is movably mounted on said table in opposition to one of said feed rolls at an entry end of said passage;
   said one feed roll and said roller being yieldably interconnected by a means adapted to translate displacement of said one feed roll by a work piece into corresponding displacement of said roller and further adapted to bias said roller against a work piece during such displacement of said roller.

6. An apparatus as in claim 5 in which said means interconnecting said roller and said one feed roll comprises a linkage including a spring means that normally biases said roller and said one feed roll toward one another.

7. An apparatus as in claim 1 in which said pair of feed rolls are simultaneously driven by said power means, one of said feed rolls being interconnected to said power means by an overrunning clutch means.

8. An apparatus as in claim 1 in which:
said one guide means includes a concave sector;
said pair of feed rolls being adapted to normally project radially inwardly of tangents to the opposite ends of said concave sector;
said pair of feed rolls each having a mounting means adapted to selectively positively limit such radially inward projection of said feed rolls.

9. An apparatus as in claim 8 in which:
said other guide means includes a convex sector in confronting relationship to said concave sector;
said convex sector being defined by a plurality of rollers adapted for sequential rolling engagement with one side of a work piece;
said concave sector being defined by a continuous rigid surface adapted for sliding engagement with an edge of an opposite side of a work piece;
one of said feed rolls at an entry end of said passage being interconnected to a counterpressure roller;
said one feed roll and said roller being yieldably interconnected by a means adapted to translate displacement of said one feed roll by a work piece into corresponding displacement of said roller and further adapted to bias said roller against the opposite side of the work piece from said one feed roll during such displacement of said roller.

10. An apparatus as in claim 1 in which:
each of said feed rolls is mounted on an end of one arm of a bell crank;
said bell crank having one end of a second arm interconnected to a spring biased rod adapted to bias the corresponding one of said rolls into forceful engagement with a side of a work piece.

11. An apparatus as in claim 10 in which each of said rods is mounted on opposite sides of a yoke, said yoke being mounted on a spring biased shaft adapted to simultaneously bias said pair of feed rolls against a work piece.

* * * * *